United States Patent
Bannur et al.

(10) Patent No.: US 10,325,221 B2
(45) Date of Patent: Jun. 18, 2019

(54) METADATA TAG DESCRIPTION GENERATION

(71) Applicant: Microsoft Technology Licensing, LLC, Redmond, WA (US)

(72) Inventors: Sushma Nagesh Bannur, Cupertino, CA (US); Omar Alonso, Redwood Shores, CA (US); Martin Hentschel, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 788 days.

(21) Appl. No.: 14/728,440

(22) Filed: Jun. 2, 2015

(65) Prior Publication Data
US 2016/0358096 A1    Dec. 8, 2016

(51) Int. Cl.
*G06N 20/00* (2019.01)
*G06F 16/78* (2019.01)
*G06F 16/907* (2019.01)
*G06F 16/9535* (2019.01)

(52) U.S. Cl.
CPC ......... *G06N 20/00* (2019.01); *G06F 16/7867* (2019.01); *G06F 16/907* (2019.01); *G06F 16/9535* (2019.01)

(58) Field of Classification Search
CPC ......... G06N 99/00; G06N 20/00; G06F 17/30
See application file for complete search history.

(56) References Cited

U.S. PATENT DOCUMENTS

| | | | |
|---|---|---|---|
| 2012/0109974 A1* | 5/2012 | Feng | G06F 17/2247 707/748 |
| 2013/0174058 A1 | 7/2013 | Kaul et al. | |
| 2013/0254231 A1 | 9/2013 | Decker et al. | |
| 2014/0095521 A1 | 4/2014 | Blount et al. | |
| 2015/0120788 A1* | 4/2015 | Brun | G06F 17/30312 707/812 |
| 2016/0072827 A1* | 3/2016 | Speer | G06F 17/30516 726/23 |

(Continued)

OTHER PUBLICATIONS

Ferragina, P., Piccinno, F., & Santoro, R. Apr. 2015. On analyzing hashtags in twitter. In Ninth International AAAI Conference on Web and Social Media.*

(Continued)

*Primary Examiner* — Eric Nilsson
(74) *Attorney, Agent, or Firm* — The Watson I.P. Group, PLC; Vladan M. Vasilijevic (57) ABSTRACT

One or more techniques and/or systems are provided for metadata tag evaluation. For example, a metadata tag, associated with content, may be identified (e.g., a hashtag #ML may be used to tag a social network post). A set of characters, within the content, may be evaluated utilizing a probability matrix and the content to identify an expanded metadata tag (e.g., an expanded hashtag "machine learning"). Descriptive content, such as websites, articles, social network posts, and/or other content associated with the expanded metadata tag, may be retrieved. A description for the metadata tag may be generated based upon the descriptive content (e.g., a definition for machine learning). In this way, the description, related metadata tags, and/or supplemental content may be provided to users having an interest in learning about the metadata tag.

20 Claims, 6 Drawing Sheets

(56) References Cited

U.S. PATENT DOCUMENTS

2016/0117063 A1* 4/2016 Fuller ............... G06F 3/04817
715/739

OTHER PUBLICATIONS

Tsur, O., & Rappoport, A. Feb. 2012. What's in a hashtag?: content based prediction of the spread of ideas in microblogging communities. In Proceedings of the fifth ACM international conference on Web search and data mining (pp. 643-652). ACM.*

Dugan, Lauren. How to Find out What that Hashtag Means. Feb. 4, 2012. [retrieved from <http://www.adweek.com/digital/how-to-find-out-what-that-hashtag-means/>.[retrieved Dec. 7, 2017].*

Gattani, et al., "Entity Extraction, Linking, Classification, and Tagging for Social Media: A Wikipedia-Based Approach", In Proceedings of the VLDB Endowment vol. 6 Issue 11, Aug. 27, 2013, 12 pages. http://pages.cs.wisc.edu/~anhai/papers/doctagger-vldb13.pdf.

Lau, et al., "Microblog Retrieval Using Topical Features and Query Expansion", In Proceedings of the Twentieth Text REtrieval Conference, Nov. 15, 2011, 6 pages. http://trec.nist.gov/pubs/trec20/papers/QUT1.microblog.pdf.

Mattull, William, "Data sets : Twitter data mining—Used keyword #bioinformatics", Published on: Feb. 28, 2013, pp. 4 Available at: http://www-958.ibm.com/software/analytics/manyeyes/datasets/twitter-data-mining-used-keyword-b/versions/1.

"How to: Use search to query social tag (hashtag) data", Retrieved on: Jun. 4, 2014, pp. 5 Available at: https://dotnetmafia.sys-con.com/node/2864731/mobile.

Deveaud, et al., "Effective Tweet Contextualization with Hashtags Performance Prediction and Multi-Document Summarization", In Proceedings of the CLEF Workshop of the Initiative for the Evaluation of XML Retrieval, Sep. 23, 2013, 7 pages. http://www.clef-initiative.eu/documents/71612/f20ff540-8fc7-476a-9c51-db20f8413cc6.

Efron, Miles, "Hashtag Retrieval in a Microblogging Environment", In Proceedings of the 33rd international ACM SIGIR conference on Research and development in information retrieval, Jul. 19, 2010, 2 pages. http://people.lis.illinois.edu/~mefron/papers/efron-sigir2010.pdf.

Jones, Kelsey, "Google Now Displays Google+ Hashtag Results in Search Queries", Published on: Sep. 26, 2013, 5 pages. http://www.searchenginejournal.com/google-now-displays-google-hashtag-results-search-queries/71403/.

"International Search Report and Written Opinion Issued in PCT Application No. PCT/US2016/035126", dated Nov. 9, 2016, 11 Pages.

Ferragina, et al., "On Analyzing Hashtags in Twitter", In the Proceedings of Ninth International AAAI Conference on Web and Social Media, May 26, 2015, 10 Pages.

Overell, et al. "Classifying Tags Using Open Content Resources", In the Proceedings of the Second ACM International Conference on Web Search and Data Mining, Feb. 9, 2016, pp. 64-73.

* cited by examiner

METADATA TAG DESCRIPTION GENERATION

BACKGROUND

Many users may utilize metadata tags to tag various content. In an example, a user may tag a vacation photo with a hashtag #myvacation. In another example, a user may tag a social network message about a baseball game with a hashtag #atthebaseballgame. Many times metadata tags may use acronyms (e.g., #tgif for thank goodness it's Friday) or newly created terms (e.g., #DWFS for a Dancing with Friends show that just premiered on television), which may be unrecognizable to some users.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for metadata tag evaluation are provided herein. In an example of metadata tag evaluation, a metadata tag, associated with content, is identified. The metadata tag comprises a set of characters. The set of characters are evaluated utilizing a probability matrix and the content to identify an expanded metadata tag. Descriptive content, associated with the expanded metadata tag, is retrieved. A description for the metadata tag is generated based upon the descriptive content. In an example, a query, comprising the metadata tag, is received. The expanded metadata tag is identified as an expansion of the metadata tag. The description for the metadata tag is provided as a query result for the query.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for metadata tag evaluation are provided herein. Users may desire to obtain descriptions of metadata tags (e.g., a description for an otherwise non-self-identifiable hashtag such as #NTVSC corresponding to an acronym for a New TV Show Sitcom), supplemental content associated with metadata tags (e.g., images and/or trailers for the New TV Show Sitcom), and/or related metadata tags (e.g., #JohnDoe corresponding to an actor in the New TV Show Sitcom). Accordingly, as provided herein, a metadata tag evaluation component may evaluate a metadata tag to generate a description for the metadata tag, identify supplemental content for the metadata tag and/or related metadata tags for the metadata tag. The metadata tag evaluation component may evaluate metadata tags in an efficient manner so that descriptions, supplemental content, and/or related metadata tags may be provided to users based upon the metadata tag evaluation. In an example, the metadata tag evaluation component may be locally hosted on a client device, and thus may mitigate bandwidth utilization and/or preserve privacy of user information, such as social network posts, calendar entries, photos, messages, and/or other content (e.g., that the user has given content to use for metadata tag evaluation). In another example, the metadata tag evaluation component may be hosted on a remote server, and thus may mitigate client side memory and/or processer utilization. In an example, at least some of the metadata tag evaluation component may be hosted locally and at least some of the metadata tag evaluation component may be hosted remotely. It may be appreciated that a user may take affirmative action, such as providing opt-in consent, to allow access to and/or use of content, information, data, etc. (e.g., social network posts, calendar entries, photos, messages, etc.), such as for the purpose of evaluating metadata tags (e.g., where a user responds to a prompt regarding the collection and/or use of such information). For example, a user of a social network may specify through a social network account setting that metadata tags and/or other social network content (e.g., used within social network posts by the user) may be used for the purpose of generating descriptions of such metadata tags.

Figure 1:
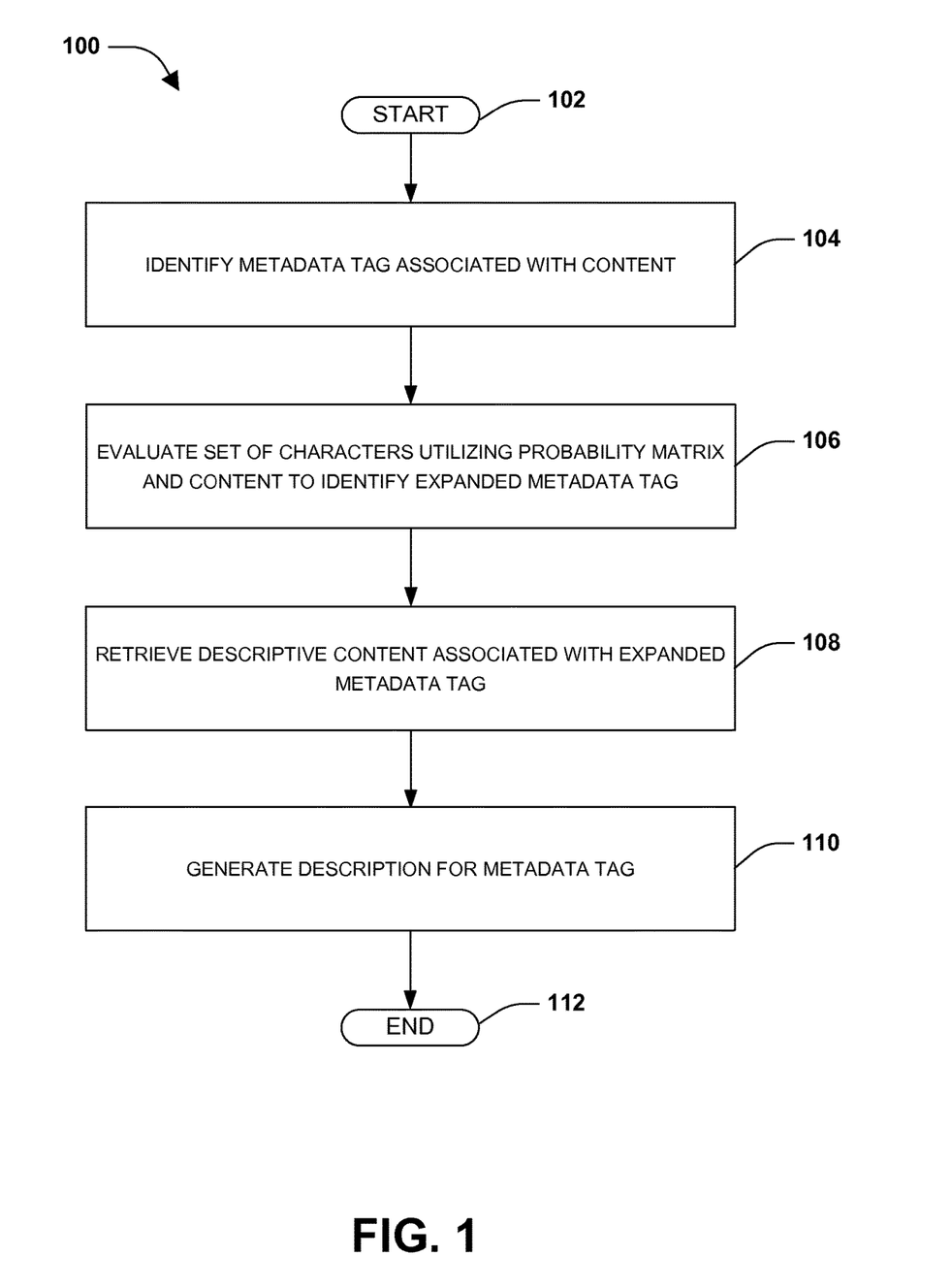
FIG. 1 is a flow diagram illustrating an exemplary method of metadata tag evaluation.

An embodiment of metadata tag evaluation is illustrated by an exemplary method 100 of FIG. 1. At 102, the method starts. At 104, a metadata tag, associated with content, may be identified, where the metadata tag comprises a set of characters. The metadata tag may comprise a hashtag or any other descriptive identifier for content. The content may comprise a social network post, a microblog message, an image, a video, a user review, a website, an article, a message, and/or a variety of other content with which a metadata tag may be associated. In an example, a metadata tag #V4JIM may be used by a user to tag a social network post "Everyone should vote for Jim in the upcoming presidential election." However, many users may not understand what the metadata tag #V4JIM means, and thus it may be advantageous to evaluate the metadata tag #V4JIM to generate a description for the metadata tag #V4JIM.

At 106, the set of characters may be evaluated utilizing a probability matrix and the content to identify an expanded metadata tag. The probability matrix may represent a likelihood/probability that a term or word, starting with a character within the set of characters, occurs within an expansion of the metadata tag and/or a likelihood/probability that a phrase, comprising terms or words starting with a character within the set of characters, would occur within the expansion of the metadata tag. In an example, the probability matrix may be a customization of a word segmentation algorithm where likelihoods/probabilities are constrained to content for metadata tags (e.g., probabilities may be based upon text within a social network post, an article, and/or a variety of other content comprising the metadata tag), and/or where acronyms within metadata tags are expanded based upon identifying a likely (e.g., the most likely) expansion based upon text within the content (e.g., the text "Everyone should vote for Jim in the upcoming presidential election"). The probability matrix may be populated based upon text and/or features (e.g., features extracted from an article, image, video, etc.) occurring in the content and/or other content associated with the metadata tag.

In an example, a first term may be identified for the first character "V" based upon the first term having a first frequency probability, within the frequency probability matrix, above a threshold (e.g., the highest frequency probability for "V"). For example, the term "vote" may be identified for the first character "V." A second term may be identified for the second character "4" based upon the second term having a second frequency probability, within the frequency probability matrix, above the threshold (e.g., the highest frequency probability for "4"). For example, the term "for" may be identified for the second character "4." A third term "Jim" may be identified based upon an evaluation of the third character "J", the fourth character "I", and the fifth character "M" utilizing the probability matrix. A phrase "vote for Jim", comprising the first term, the second term, and the third term, may be identified for inclusion within the expanded metadata tag based upon the phrase having a phrase frequency probability, within the probability matrix, above a phrase threshold (e.g., a highest phase frequency probability indicating a relatively high likelihood of the first term, the second term, and the third term occurring together within the expansion of the metadata tag). It may be appreciated that a plurality of term candidates and/or phrase candidates may be identified and evaluated against the probability matrix to identify the expansion of the metadata tag. In this way, the expanded metadata tag may be identified as "vote for Jim."

At 108, descriptive content associated with the expanded metadata tag "vote for Jim" may be retrieved. For example, an internet encyclopedia description for Jim, a voting website, a social network profile of Jim, images of Jim, videos of Jim's political speeches, and/or a variety of other descriptive content may be retrieved. At 110, a description for the metadata tag may be generated based upon the descriptive content. In an example, a descriptive phrase may be extracted from the descriptive content, such as a descriptive phrase "Jim was born in Ohio in 1952, and is currently running for president of the United States" that is extracted from the social network profile of Jim. Responsive to the descriptive phrase "Jim was born in Ohio in 1952, and is currently running for president of the United States" occurring within and/or substantially matching at least some of the descriptive content (e.g., images, videos, the voting website, a campaign email, the internet encyclopedia description for Jim, etc.) above a threshold, the descriptive phrase may be included within the description of the metadata tag #V4JIM. For example, if the phrase "Jim was born in Ohio in 1952, and is currently running for president of the United States" and/or a phrase determined to be sufficiently similar to that phrase (e.g., above some threshold, within some parameters (e.g., word count), etc.) appear(s) in the social network profile of Jim and/or other descriptive content (e.g., images, videos, online text, etc. related to Jim) a number of times exceeding a threshold, then the descriptive phrase may be included within the description of the metadata tag #V4JIM.

In an example, a first description candidate ("Jim was born in Ohio, is 5 feet tall, and is running for class president") and a second description candidate (e.g., "Jim was born in Alabama, is 6 feet tall, and is running for president") may be generated as potential descriptions of the metadata tag based upon text and/or features of the descriptive content associated with the expanded metadata tag. Because the descriptive candidates may not comprise cohesive or consistent descriptions, the descriptive candidates may be provided to users for evaluation (e.g., utilizing a crowdsourcing technique). A user selection of either the first descriptive candidate or the second descriptive candidate may be received for utilization in generating the description for the metadata tag (e.g., the first descriptive candidate or the second descriptive candidate is selected over remaining descriptive candidates based upon the user selection).

In an example, supplemental content, corresponding to the expanded metadata tag, may be identified. The supplemental content may comprise an image (e.g., a photo of Jim giving a speech), a video (e.g., a video of Jim at a parade), a social network profile of Jim, a keyword (e.g., a campaign slogan that may be used by a user through a search interface to locate more information about Jim), a website, an app suggestion for an app available for download from an app store (e.g., a voting app), an advertisement (e.g., a campaign ad for Jim), etc. In an example, the supplemental content may be identified as a trending image, a trending video, a trending article, and/or any other trending content that may be referenced by, for example, social network content associated with the metadata tag (e.g., a social network post, of an image, tagged with the metadata tag).

In an example, second content, comprising the metadata tag, may be retrieved. For example, an article, tagged by a user with the #V4JIM metadata tag, may be retrieved. The second content, such as text or hashtags of the article, may be evaluated to identify a related metadata tag that is related to the metadata tag. For example, a hashtag #Jim4Prez, used to tag the article, may be identified as the related metadata tag.

In an example, the expanded metadata tag may be determined as corresponding to spam or explicit content. For example, there may not be an actual Jim running for president, and a malicious source may be seeking campaign contributions for a fake campaign. Accordingly, the metadata tag and/or the description may be marked as spam and/or as explicit content.

In this way, an expanded metadata tag, a description, supplemental content, related metadata tags, spam, and/or explicit content may be identified based upon an evaluation of the metadata tag. Such information may be provided to users so that such users may learn a definition of the metadata tag, explore supplemental content, learn of related metadata tags, and/or receive warnings of spam and/or explicit content. For example, a query, comprising the metadata tag, may be received (e.g., a user may submit a query "what is #V4JIM"). The expanded metadata tag "vote for Jim" may be identified as an expansion of the metadata tag #V4JIM. Accordingly, the expanded metadata tag, the description, the supplemental content, the related metadata tags, warnings, etc. may be provided as query results for the query.

In an example, descriptions of metadata tags may be stored within a data structure (e.g., database, etc.). Because a metadata tag may have different meanings overtime, multiple descriptions may be generated for the metadata tag and may be stored in the data structure based upon temporal identifiers corresponding to time ranges during which descriptions are descriptive of the metadata tag. For example, a metadata tag #XFL may have stood for an Xtreme Football League during a first time range (e.g., during 2001, the only year the XFL was in operation), and thus an expanded metadata tag Xtreme Football League may be identified from the metadata tag #XFL. An Xtreme Football League description may be generated for the metadata tag #XFL based upon Xtreme Football League descriptive content associated with the first time range. A first temporal identifier, corresponding to the first time range during which the Xtreme Football League description was descriptive of the metadata tag #XFL, may be associated with the Xtreme Football League description. The Xtreme Football League description may be stored within the data structure based upon the first temporal identifier. A second description for the metadata tag may be generated based upon a second expanded metadata tag and second descriptive content associated with a second time range. For example, an Extreme Fishing League description may be generated for the metadata tag #XFL based upon a second expanded metadata tag Extreme Fishing League and Extreme Fishing League descriptive content associated with a second time range (e.g., a time range spanning from a 2011 season through a current season). A second temporal identifier, corresponding to the second time range during which the Extreme Fishing League description was descriptive of the metadata tag #XFL, may be associated with the Extreme Fishing League description. The Extreme Fishing League description may be stored within the data structure based upon the second temporal identifier. In an example, the various descriptions may be stored along a timeline (e.g., based upon associated temporal identifiers) that may be presented to a user so that the user may better understand, utilize, and/or disambiguate such descriptions (e.g., how such descriptions have evolved over time). It will be appreciated that any information (e.g., not just descriptions) related to metadata tags may similarly be associated with temporal identifiers (e.g., expanded metadata tags, supplemental content, related metadata tags, warnings, etc.).

It may be appreciated that a description for a metadata tag may be provided in various manners (e.g., embedded within content tagged with the metadata tag; provided as a search result; etc.). In an example, when a metadata tag is used to tag content (e.g., a user creates a social network post tagged with the metadata tag #XFL), the description may be provided along with the content (e.g., an option to view the Extreme Fishing League description may be provided through a user interface element, such as a button, associated with the social network post; the Extreme Fishing League description may be in-lined with the metadata tag #XFL, such as displayed before (e.g., "Extreme Fishing League #XFL") or after (e.g., "XFL Extreme Fishing League") the metadata tag #XFL; the Extreme Fishing League description may be displayed as a caption or pop-up when a user hovers over the metadata tag #XFL with a cursor; etc.). At 112, the method ends.

Figure 2:
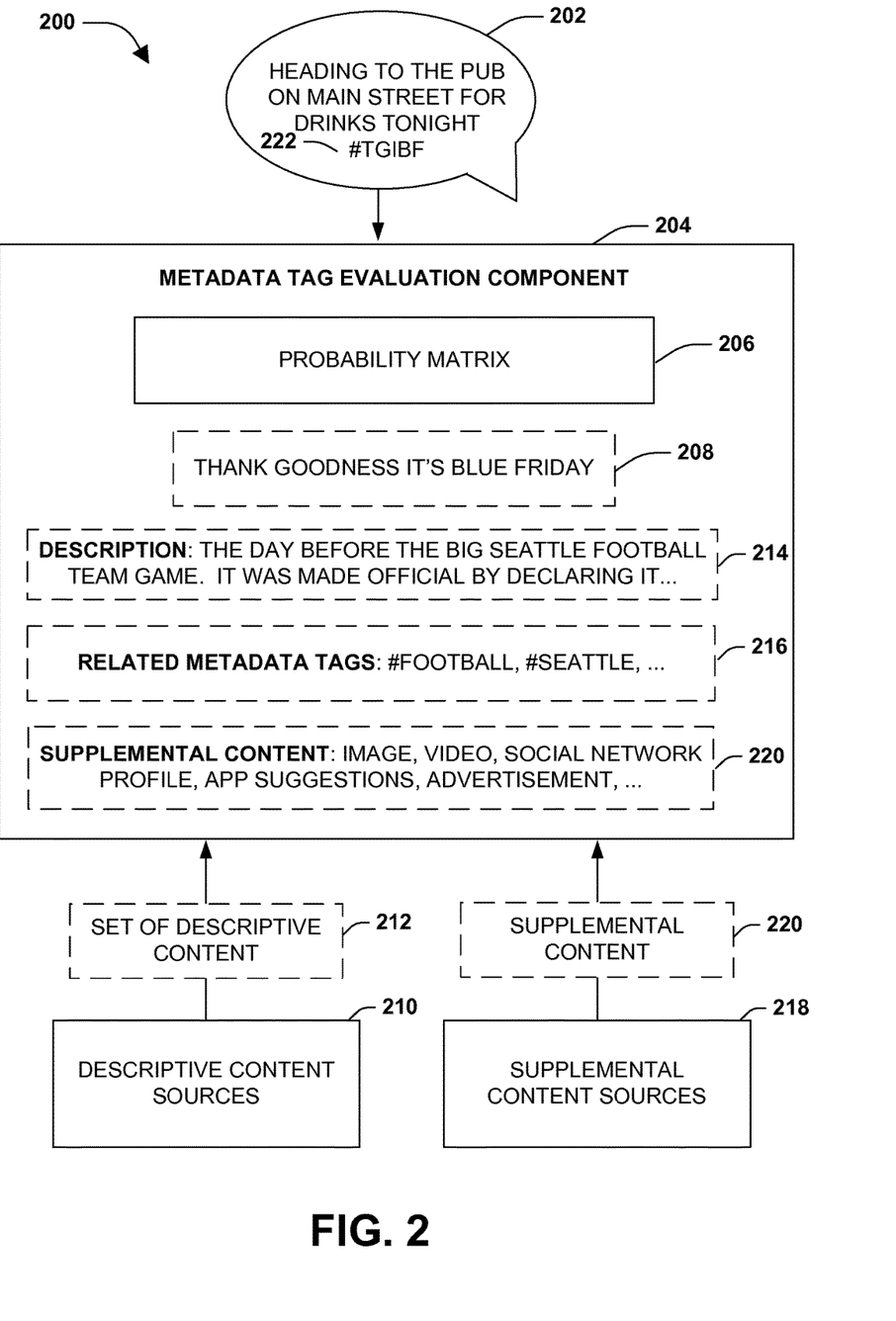
FIG. 2 is a component block diagram illustrating an exemplary system for metadata tag evaluation, where a description for a metadata tag is generated.

FIG. 2 illustrates an example of a system 200 for metadata tag evaluation. The system 200 comprises a metadata tag evaluation component 204. The metadata tag evaluation component 204 may identify a metadata tag #TGIBF 222 associated with content, such as a social network post 202 about heading to a pub on Main street for drinks tonight. The metadata tag #TGIBF 222 may comprise a set of characters T, G, I, B, and F. The metadata tag evaluation component 204 may evaluate the set of characters T, G, I, B, and F utilizing a probability matrix 206 to identify an expanded metadata tag 208. For example, the term "thank" may be identified as having a first probability, within the probability matrix 206, above a threshold for the character "T", the term "goodness" may be identified as having a second probability, within the probability matrix 206, above a threshold for the character "G", the term "it's" may be identified as having a third probability, within the probability matrix 206, above a threshold for the character "I", the term "blue" may be identified as having a fourth probability, within the probability matrix 206, above a threshold for the character "B", and the term "Friday" may be identified as having a fifth probability, within the probability matrix 206, above a threshold for the character "F". It may be appreciated that a variety of terms may be considered for a character (e.g., the term "thank", a term "the", a term "taste", a term "towel", etc.), and that the probability matrix 206, which may be based upon content such as text within the social network post 202, may be used to identify a term having a relatively high likelihood of frequently occurring for the character and/or occurring as part of a phrase with other terms identified for other characters within the set of characters (e.g., a high probability that the term "thank" and the term "goodness" occur together in an expansion of the metadata tag 222). In this way, the expanded metadata tag 208 of "thank goodness it's blue Friday" may be identified utilizing the probability matrix 206.

The metadata tag evaluation component 204 may retrieve descriptive content, such as a set of descriptive content 212, from descriptive content sources 210. The descriptive content may comprise articles, internet encyclopedia descriptions, social network posts, and/or a variety of content that may describe the expanded metadata tag 208. The descriptive content may be evaluated to generate a description 214 for the metadata tag #TGIBF 222. For example, a descriptive phrase (e.g., "the day before the big Seattle football team game. It was made official by declaring it . . . ") may be extracted from a website. The descriptive phrase may be included within the description 214 based upon the descriptive phrase occurring within the set of descriptive content 212 above a threshold (e.g., within a threshold number or percentage of social network posts, websites, and/or other content). The metadata tag evaluation component 204 may identify related metadata tags 216, such as #football, #Seattle, etc., based upon metadata tags used to tag the descriptive content within the set of descriptive content 212, which may indicate that the metadata tags may be related to the metadata tag #TGIBF 222 and/or the expanded metadata tag 208. The metadata tag evaluation component 204 may retrieve supplemental content 220 from supplemental content sources 218. For example, an image, a video, a social network profile, app suggestions, an advertisement, and/or other content relating to the metadata tag #TGIBF 222 and/or the expanded metadata tag 208 may be retrieved. In this way, the metadata tag evaluation component 204 evaluates the metadata tag #TGIBF 222 in order to generate the description 214, identify the related metadata tags 216, and/or retrieve the supplemental content 220, which may be provided to a user that may be interested in learning more about the metadata tag #TGIBF 222.

Figure 3:
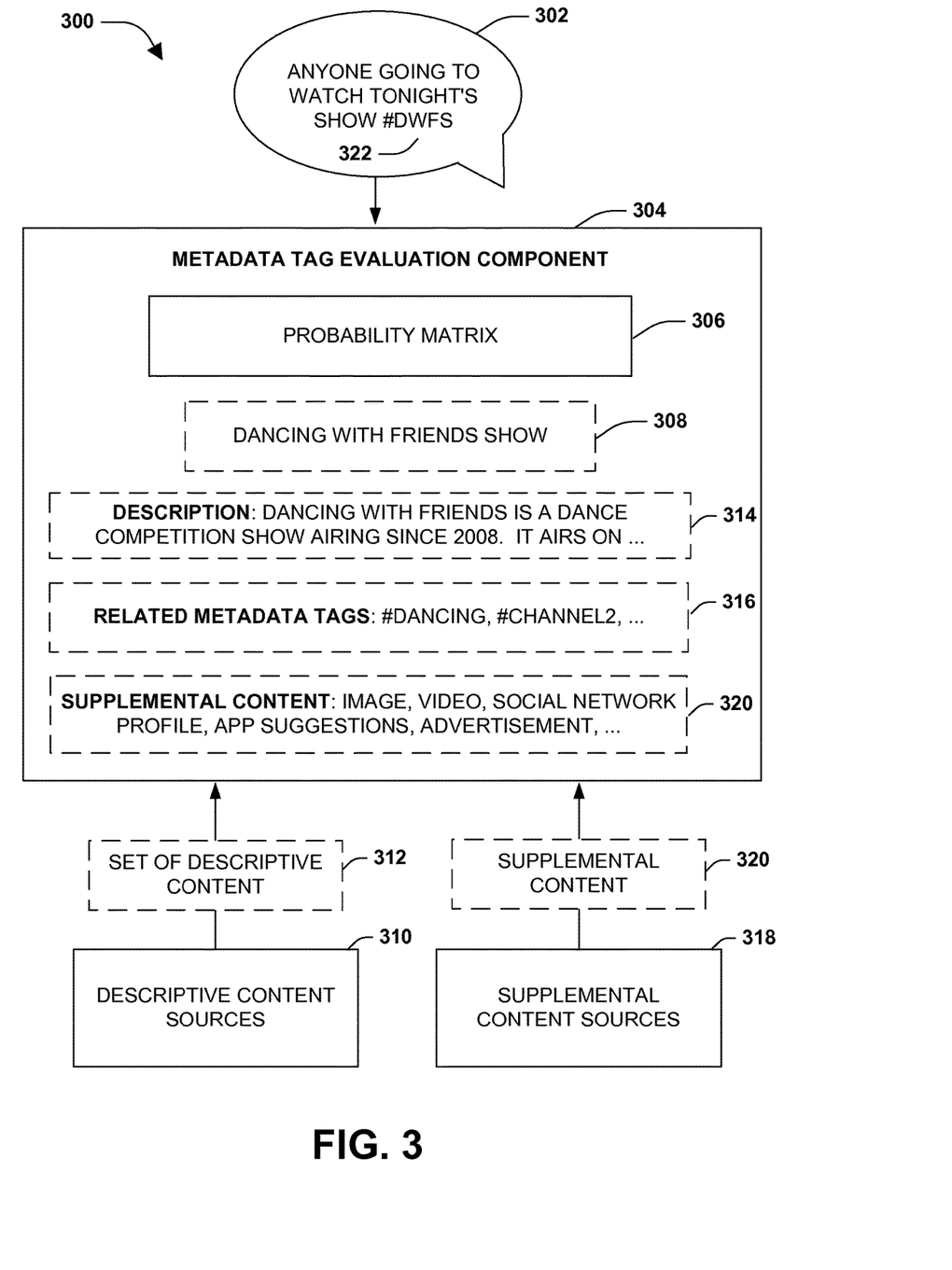
FIG. 3 is a component block diagram illustrating an exemplary system for metadata tag evaluation, where a description for a metadata tag is generated.

FIG. 3 illustrates an example of a system 300 for metadata tag evaluation. The system 300 comprises a metadata tag evaluation component 304. The metadata tag evaluation component 304 may identify a metadata tag #DWFS 322 associated with content, such as a social network post 302 asking whether other users are going to watch tonight's show. The metadata tag #DWFS 322 may comprise a set of characters D, W, F, and S. The metadata tag evaluation component 304 may evaluate the set of characters D, W, F, and S utilizing a probability matrix 306 to identify an expanded metadata tag 308. For example, the term "dancing" may be identified as having a first probability, within the probability matrix 306, above a threshold for the character "D", the term "with" may be identified as having a second probability, within the probability matrix 306, above a threshold for the character "W", the term "friends" may be identified as having a third probability, within the probability matrix 306, above a threshold for the character "F", and the term "show" may be identified as having a fourth probability, within the probability matrix 306, above a threshold for the character "S". It may be appreciated that a variety of terms may be considered for a character (e.g., a term "desk", a term "dog", a term "Dave", a term "dogwood", etc.), and that the probability matrix 306, which may be based upon content such as terms within the social network post 302, may be used to identify a term having a relatively high likelihood of frequently occurring for the character and/or occurring as part of a phrase with other terms identified for other characters within the set of characters (e.g., a high probability that the term "dancing" and the term "show" occur together in an expansion of the metadata tag 322). In this way, the expanded metadata tag 308 of "Dancing with Friends show" may be identified utilizing the probability matrix 306.

The metadata tag evaluation component 304 may retrieve descriptive content, such as a set of descriptive content 312, from descriptive content sources 310. The descriptive content may comprise articles, internet encyclopedia descriptions, social network posts, a television website, photos, and/or a variety of content that may describe the expanded metadata tag 308. The descriptive content may be evaluated to generate a description 314 for the metadata tag #DWFS 322. For example, a descriptive phrase (e.g., "Dancing with Friends is a dance competition show airing since 2008. It airs on . . . ") may be extracted from the television website. The descriptive phrase may be included within the description 314 based upon the descriptive phrase occurring within the set of descriptive content 312 (e.g., within a threshold number or percentage of social network posts, websites, and/or other content) above a threshold. The metadata tag evaluation component 304 may identify related metadata tags 316, such as #dancing, #channel2, etc., based upon metadata tags used to tag the descriptive content within the set of description content 312, which may indicate that the metadata tags may be related to the metadata tag #DWFS 322 and/or the expanded metadata tag 308. The metadata tag evaluation component 304 may retrieve supplemental content 320 from supplemental content sources 318. For example, an image, a video, a social network profile, app suggestions, an advertisement, and/or other content relating to the metadata tag #DWFS 322 and/or the expanded metadata tag 308 may be retrieved. In this way, the metadata tag evaluation component 304 evaluates the metadata tag #DWFS 322 in order to generate the description 314, identify the related metadata tags 316, and/or retrieve the supplemental content 320, which may be provided to a user that may be interested in learning more about the metadata tag #DWFS 322.

Figure 4:
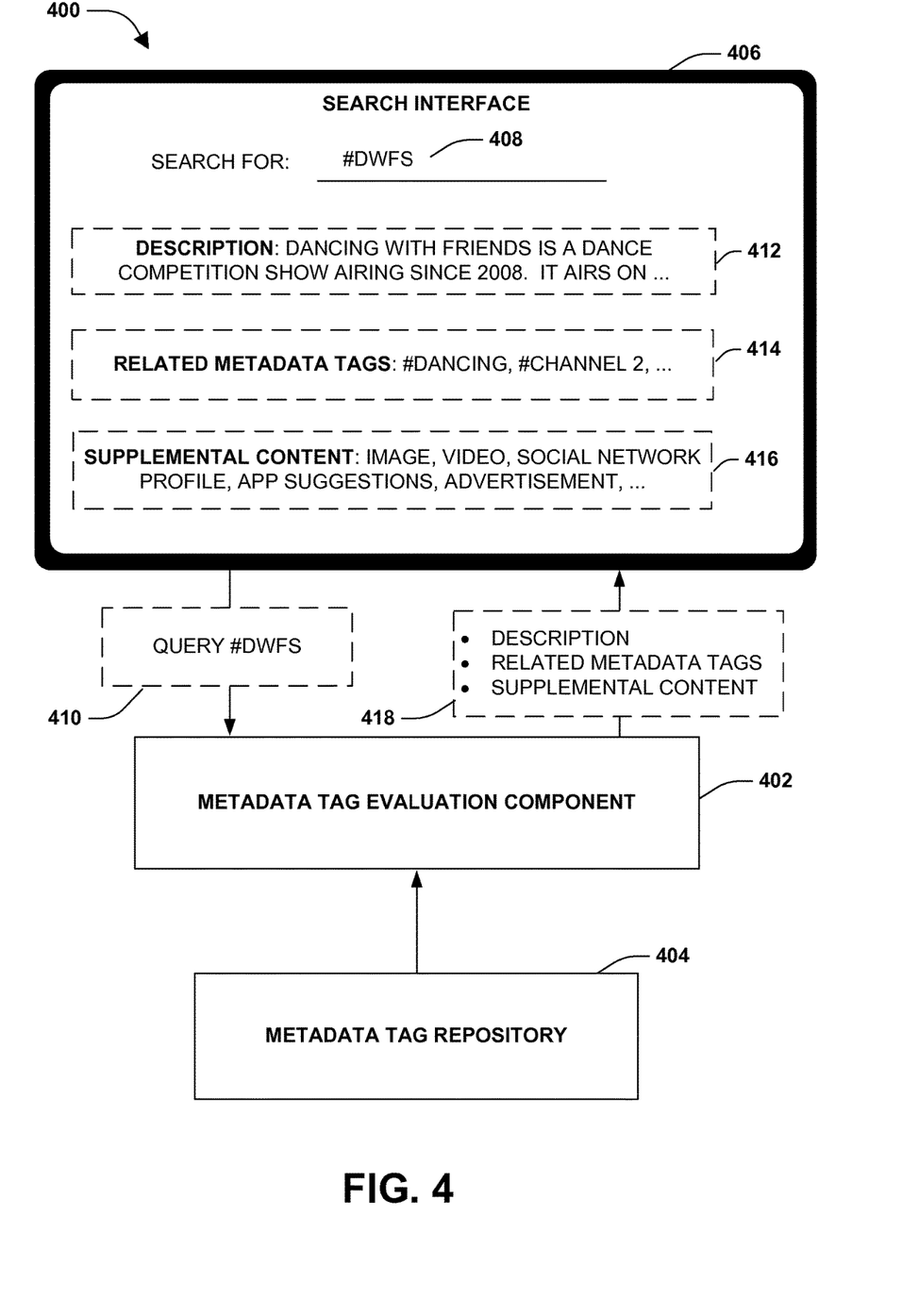
FIG. 4 is a component block diagram illustrating an exemplary system for metadata tag evaluation, where a description for a metadata tag is provided as a query result.

FIG. 4 illustrates an example of a system 400 for providing query results 418 for a query 410 comprising a metadata tag 408. The system 400 comprises a metadata tag evaluation component 402. The metadata tag evaluation component 402 may be associated with a metadata tag repository 404 within which descriptions of metadata tags, related metadata tags, and/or supplemental content related to metadata tags and/or expansions of metadata tags may be stored, indexed, and/or identified. The metadata tag evaluation component 402 may be associated with a search interface 406 (e.g., a web-based search engine interface) accessible by a client device of a user. The user may submit the query 410 comprising the metadata tag 408 of #DWFS within the search interface 406 in an attempt to better understand the meaning of #DWFS.

The metadata tag evaluation component 402 may receive the query 410. The metadata tag evaluation component 402 may determine that an expanded metadata tag of "Dancing with Friends show" may be an expansion of the metadata tag 408 of #DWFS. The metadata tag evaluation component 402 may retrieve a description 412 for the metadata tag 408, related metadata tags 414 that are related to the metadata tag 408, and/or supplemental content 416 for the metadata tag from the metadata tag repository 404 (e.g., based upon the expanded metadata tag). The metadata tag evaluation component 402 may provide search results 418 through the search interface 406 for the query 410. For example, the search results 418 may comprise the description 412 "dancing with Friends is a dance competition show airing since 2008. It airs on . . . ", the related metadata tags 414 of #dancing and #channel2, and/or the supplement content 416 of images, videos, social network profiles, app suggestions, advertisements, and/or other content related to the metadata tag 408 #DWFS.

According to an aspect of the instant disclosure, a method for metadata tag evaluation is provided. The method includes identifying a metadata tag associated with content. The metadata tag may comprise a set of characters. The set of characters may be evaluated utilizing a probability matrix and the content to identify an expanded metadata tag. Descriptive content, associated with the expanded metadata tag, may be retrieved. A description for the metadata tag may be generated based upon the descriptive content.

According to an aspect of the instant disclosure, a system for metadata tag evaluation is provided. The system includes a metadata tag evaluation component. The metadata tag evaluation component may be configured to identify a metadata tag associated with content. The metadata tag may comprise a set of characters. The metadata tag evaluation component may be configured to evaluate the set of characters utilizing a probability matrix and the content to identify an expanded metadata tag. The metadata tag evaluation component may be configured to retrieve descriptive content associated with the expanded metadata tag. The metadata tag evaluation component may be configured to generate a description for the metadata tag based upon the descriptive content.

According to an aspect of the instant disclosure, a computer readable medium comprising instructions which when executed perform a method for metadata tag evaluation is provided. The computer readable medium includes identifying a metadata tag associated with content. The metadata tag may comprise a set of characters. The set of characters may be evaluated utilizing a probability matrix and the content to identify an expanded metadata tag. Descriptive content, associated with the expanded metadata tag, may be retrieved. A description for the metadata tag may be generated based upon the descriptive content. A query, comprising the metadata tag, may be received. The expanded metadata tag may be identified as an expansion of the metadata tag. The description for the metadata tag may be provided as a query result for the query.

According to an aspect of the instant disclosure, a means for metadata tag evaluation is provided. A metadata tag associated with content may be identified, by the means for metadata tag evaluation. The metadata tag may comprise a set of characters. The set of characters may be evaluated utilizing a probability matrix and the content to identify an expanded metadata tag, by the means for metadata tag evaluation. Descriptive content, associated with the expanded metadata tag, may be retrieved, by the means for metadata tag evaluation. A description for the metadata tag may be generated based upon the descriptive content, by the means for metadata tag evaluation.

According to an aspect of the instant disclosure, a means for metadata tag evaluation is provided. A metadata tag associated with content may be identified, by the means for metadata tag evaluation. The metadata tag may comprise a set of characters. The set of characters may be evaluated utilizing a probability matrix and the content to identify an expanded metadata tag, by the means for metadata tag evaluation. Descriptive content, associated with the expanded metadata tag, may be retrieved, by the means for metadata tag evaluation. A description for the metadata tag may be generated based upon the descriptive content, by the means for metadata tag evaluation. A query, comprising the metadata tag, may be received, by the means for metadata tag evaluation. The expanded metadata tag may be identified as an expansion of the metadata tag, by the means for metadata tag evaluation. The description for the metadata tag may be provided as a query result for the query, by the means for metadata tag evaluation.

Figure 5:
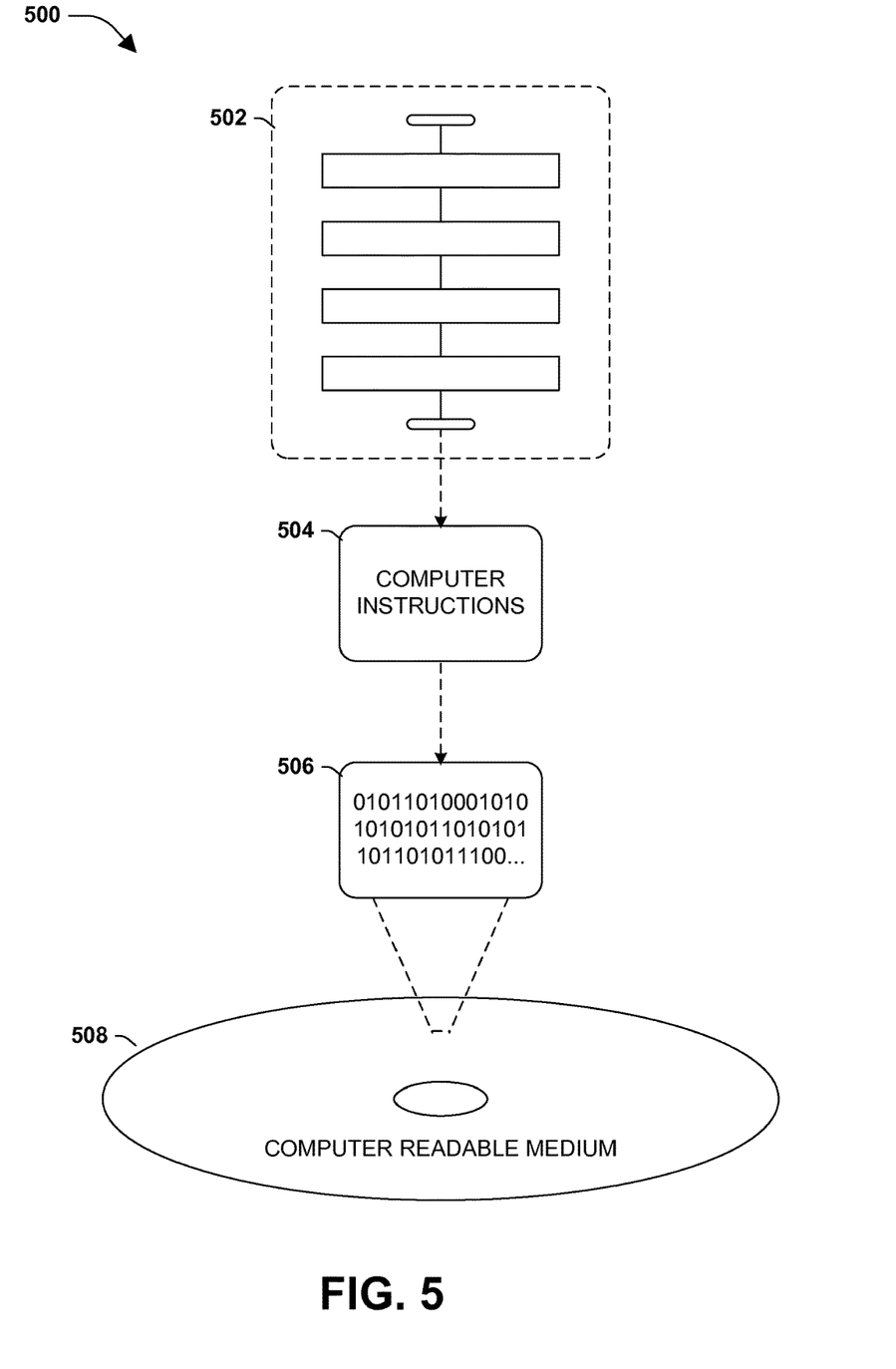
FIG. 5 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 100 of FIG. 1, for example. In some embodiments, the processor-executable instructions 504 are configured to implement a system, such as at least some of the exemplary system 200 of FIG. 2, at least some of the exemplary system 300 of FIG. 3, and/or at least some of the exemplary system 400 of FIG. 4, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
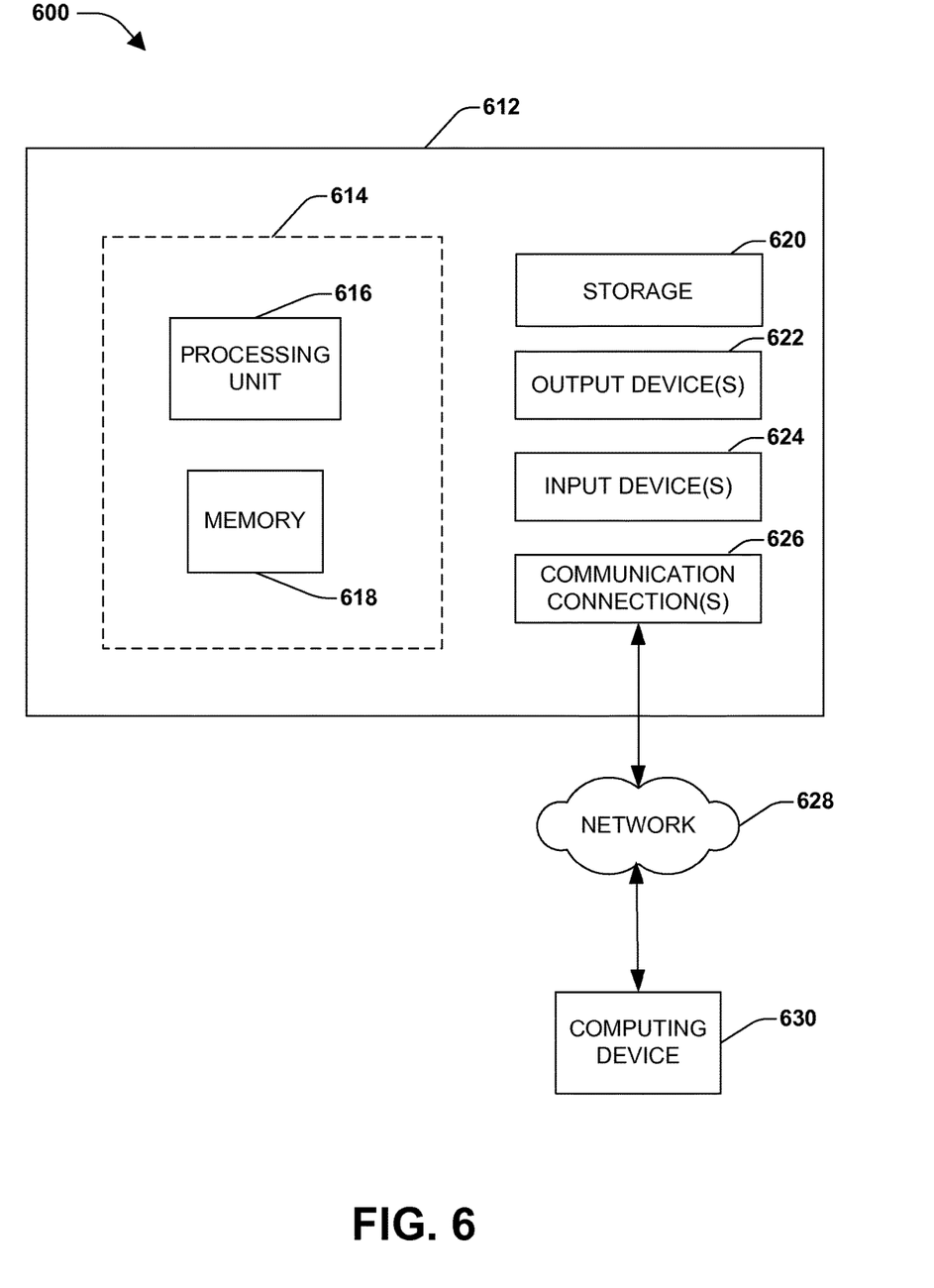
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of improving computer search results by extending a computer search index with generated metadata tag descriptions, the method comprising:
  obtaining, at a computing device, content comprising a metadata tag comprising textual characters;
  identifying, with the computing device, a first word or phrase based on a first probability that the first word or phrase corresponds to a first one or more textual characters of the metadata tag being above a first threshold probability, the first threshold probability being based on the first one or more textual characters, wherein the first probability is obtained from a probability matrix that identifies probabilities that one or more textual characters represent one or more words based on other textual characters of a same metadata tag and based on the obtained content;
  identifying, with the computing device, a second word or phrase based on a second probability that the second word or phrase corresponds to a second one or more textual characters of the metadata tag being above a second threshold probability, the second threshold probability being based on the second one or more textual characters, the second threshold probability differing from the first threshold probability, wherein the second probability is also obtained from the probability matrix;
  generating, with the computing device, an expanded version of the metadata tag, the expanded metadata tag comprising the first word or phrase in place of the first one or more textual characters, the second word or phrase in place of the second one or more textual characters, and other words or phrases in place of corresponding other characters of the metadata tag, the other words or phrases having been identified in a manner analogous to the identifying the first word or phrase and the identifying the second word or phrase;
  retrieving, at the computing device, descriptive content providing further information about the expanded metadata tag, the descriptive content differing from the obtained content; and
  generating, at the computing device, a description for the metadata tag based upon the retrieved descriptive content.

2. The method of claim 1, comprising:
  receiving a search query comprising the metadata tag;
  identifying the expanded metadata tag as an expansion of the metadata tag; and
  providing the generated description for the metadata tag as a search result for the query.

3. The method of claim 1, comprising:
  obtaining a second content comprising a second metadata tag, the obtained second content also comprising the metadata tag; and
  identifying the second metadata tag as being related to the metadata tag.

4. The method of claim 3, comprising:
  receiving a search query comprising the metadata tag; and
  providing both the description for the metadata tag and, as a suggestion, the second metadata tag.

5. The method of claim 1, the generating the description comprising:
  extracting a descriptive phrase from the descriptive content; and
  responsive to the descriptive phrase occurring within the descriptive content above a threshold, including the descriptive phrase within the description.

6. The method of claim 1, the generating the description comprising:
  generating a first description candidate and a second description candidate for the metadata tag based upon the descriptive content; and
  receiving a user selection of either the first description candidate or the second description candidate for utilization in generating the description for the metadata tag.

7. The method of claim 1, further comprising:
  responsive to determining that the expanded metadata tag corresponds to at least one of spam or explicit content, marking at least one of the metadata tag or the generated description as at least one of spam or explicit content.

8. The method of claim 1, further comprising:
  associating a first temporal identifier with the generated description, the first temporal identifier corresponding to a first time range during which the generated description is descriptive of the metadata tag;
  generating a second description for the metadata tag associated with a second time range, the generated second description differing from the generated description and based on a second descriptive content that differs from the descriptive content; and
  associating a second temporal identifier with the generated second description, the second temporal identifier corresponding to the second time range during which the generated second description is descriptive of the metadata tag.

9. The method of claim 1, comprising:
  identifying social media content comprising both the metadata tag and a reference to supplemental content that is external to the social media content;
  receiving a search query comprising the metadata tag; and
  providing both the generated description for the metadata tag and the supplemental content as search results for the query.

10. A computing device for improving computer search results by extending a computer search index with generated metadata tag descriptions, the computing device comprising:
  one or more processing units; and
  computer-readable memory comprising computer-executable instructions, which, when executed by the one or more processing units, cause the computing device to:
    obtain content comprising a metadata tag comprising textual characters;
    identify a first word or phrase based on a first probability that the first word or phrase corresponds to a first one or more textual characters of the metadata tag being above a first threshold probability, the first threshold probability being based on the first one or more textual characters, wherein the first probability is obtained from a probability matrix that identifies probabilities that one or more textual characters represent one or more words based on other textual characters of a same metadata tag and based on the obtained content;
    identify a second word or phrase based on a second probability that the second word or phrase corresponds to a second one or more textual characters of the metadata tag being above a second threshold probability, the second threshold probability being based on the second one or more textual characters, the second threshold probability differing from the first threshold probability, wherein the second probability is also obtained from the probability matrix;

generate an expanded version of the metadata tag, the expanded metadata tag comprising the first word or phrase in place of the first one or more textual characters, the second word or phrase in place of the second one or more textual characters, and other words or phrases in place of corresponding other characters of the metadata tag, the other words or phrases having been identified in a manner analogous to the identifying the first word or phrase and the identifying the second word or phrase;

retrieve descriptive content providing further information about the expanded metadata tag, the descriptive content differing from the obtained content; and generate a description for the metadata tag based upon the retrieved descriptive content.

11. The computing device of claim 10, wherein the computer-readable memory comprises further computer-executable instructions, which, when executed by the one or more processing units, cause the computing device to:
receive a search query comprising the metadata tag;
identify the expanded metadata tag as an expansion of the metadata tag; and
provide the generated description for the metadata tag as a search result for the query.

12. The computing device of claim 10, wherein the computer-readable memory comprises further computer-executable instructions, which, when executed by the one or more processing units, cause the computing device to:
obtain a second content comprising a second metadata tag, the obtained second content also comprising the metadata tag;
identify the second metadata tag as being related to the metadata tag;
receive a search query comprising the metadata tag; and
provide both the description for the metadata tag and, as a suggestion, the second metadata tag.

13. The computing device of claim 10, wherein the computer-readable memory comprises further computer-executable instructions, which, when executed by the one or more processing units, cause the computing device to:
extract a descriptive phrase from the descriptive content; and
responsive to the descriptive phrase occurring within the descriptive content above a threshold, include the descriptive phrase within the description.

14. The computing device of claim 10, wherein the computer-readable memory comprises further computer-executable instructions, which, when executed by the one or more processing units, cause the computing device to:
associate a first temporal identifier with the generated description, the first temporal identifier corresponding to a first time range during which the generated description is descriptive of the metadata tag;
generate a second description for the metadata tag associated with a second time range, the generated second description differing from the generated description and based on a second descriptive content that differs from the descriptive content; and
associate a second temporal identifier with the generated second description, the second temporal identifier corresponding to the second time range during which the generated second description is descriptive of the metadata tag.

15. The computing device of claim 10, wherein the computer-readable memory comprises further computer-executable instructions, which, when executed by the one or more processing units, cause the computing device to:
identify social media content comprising both the metadata tag and a reference to supplemental content that is external to the social media content;
receive a search query comprising the metadata tag; and
provide both the generated description for the metadata tag and the supplemental content as search results for the query.

16. A computer readable storage medium comprising computer-executable instructions, which, when executed, cause a computing device to improve computer search results by extending a computer search index with generated metadata tag descriptions by performing steps comprising:
obtaining content comprising a metadata tag comprising textual characters;
identifying a first word or phrase based on a first probability that the first word or phrase corresponds to a first one or more textual characters of the metadata tag being above a first threshold probability, the first threshold probability being based on the first one or more textual characters, wherein the first probability is obtained from a probability matrix that identifies probabilities that one or more textual characters represent one or more words based on other textual characters of a same metadata tag and based on the obtained content;
identifying, with the computing device, a second word or phrase based on a second probability that the second word or phrase corresponds to a second one or more textual characters of the metadata tag being above a second threshold probability, the second threshold probability being based on the second one or more textual characters, the second threshold probability differing from the first threshold probability, wherein the second probability is also obtained from the probability matrix;
generating an expanded version of the metadata tag, the expanded metadata tag comprising the first word or phrase in place of the first one or more textual characters, the second word or phrase in place of the second one or more textual characters, and other words or phrases in place of corresponding other characters of the metadata tag, the other words or phrases having been identified in a manner analogous to the identifying the first word or phrase and the identifying the second word or phrase;
retrieving descriptive content providing further information about the expanded metadata tag, the descriptive content differing from the obtained content; and
generating a description for the metadata tag based upon the retrieved descriptive content.

17. The computer readable medium of claim 16, comprising further computer-executable instructions, which, when executed, further cause the computing device to perform steps comprising:
obtaining a second content comprising a second metadata tag, the obtained second content also comprising the metadata tag;
identifying the second metadata tag as being related to the metadata tag;
receiving a search query comprising the metadata tag; and
providing both the description for the metadata tag and, as a suggestion, the second metadata tag.

18. The computer readable medium of claim 16, comprising further computer-executable instructions, which, when executed, further cause the computing device to perform steps comprising:
  associating a first temporal identifier with the generated description, the first temporal identifier corresponding to a first time range during which the generated description is descriptive of the metadata tag;
  generating a second description for the metadata tag associated with a second time range, the generated second description differing from the generated description and based on a second descriptive content that differs from the descriptive content; and
  associating a second temporal identifier with the generated second description, the second temporal identifier corresponding to the second time range during which the generated second description is descriptive of the metadata tag.

19. The computer readable medium of claim 16, comprising further computer-executable instructions, which, when executed, further cause the computing device to perform steps comprising:
  extract a descriptive phrase from the descriptive content; and
  responsive to the descriptive phrase occurring within the descriptive content above a threshold, include the descriptive phrase within the description.

20. The computer readable medium of claim 16, comprising further computer-executable instructions, which, when executed, further cause the computing device to perform steps comprising:
  identifying social media content comprising both the metadata tag and a reference to supplemental content that is external to the social media content;
  receiving a search query comprising the metadata tag; and
  providing both the generated description for the metadata tag and the supplemental content as search results for the query.

* * * * *